United States Patent [19]
Bruschi et al.

[11] Patent Number: 5,493,095
[45] Date of Patent: Feb. 20, 1996

[54] LASER BEAM DIVERGENCE COMPENSATION APPARATUS

[75] Inventors: Giorgio Bruschi, Action; Dean Coe, Groton, both of Mass.

[73] Assignee: Data Technology, Inc., Woburn, Mass.

[21] Appl. No.: 195,966

[22] Filed: Feb. 14, 1994

[51] Int. Cl.⁶ .................................................. B23K 26/02
[52] U.S. Cl. ............................. 219/121.75; 219/121.78; 219/121.73
[58] Field of Search .................... 219/121.73, 121.74, 219/121.75, 121.83, 121.61, 121.62, 121.78, 121.79

[56] References Cited

U.S. PATENT DOCUMENTS

| | | | |
|---|---|---|---|
| 4,275,288 | 6/1981 | Makosch et al. | 219/121.67 |
| 4,358,659 | 11/1982 | Spohnheimer | 219/121 LB |
| 4,573,467 | 3/1986 | Rich et al. | 128/303.1 |
| 4,742,206 | 5/1988 | Dietterich et al. | 219/121 LG |
| 4,973,330 | 11/1990 | Azema et al. | 606/5 |
| 5,061,839 | 10/1991 | Matsuno et al. | 219/121.83 |
| 5,109,149 | 4/1992 | Leung | 219/121.69 |

FOREIGN PATENT DOCUMENTS 2202647  9/1988  United Kingdom .............. 219/121.75

*Primary Examiner*—Mark H. Paschall
*Attorney, Agent, or Firm*—William B. Ritchie

[57] ABSTRACT

A laser-machining apparatus that utilizes "flying optics" having at least one lens that corrects the divergence of the laser beam as it is emitted from the laser. Without correction, "flying optics" type of systems cannot be used with materials requiring a kerf that must be kept within tolerances not exceeding a couple of thousandths of an inch. The preferred embodiment utilizes a vertical lens that focuses the beam on the surface of the work piece. An additional adjustment of the vertical position of that lens is provided that corresponds to the distance that the carriage is from the laser and degree of divergence experienced with the laser that is being used. An alternative embodiment places at least one beam adjustment lens between the laser and the redirecting mirror that redirects the beam from the laser onto the surface of the work piece. In this embodiment, adjustment of the vertical lens to compensate for the laser beam divergence is unnecessary. The beam adjustment lens focuses the beam into a narrow waist before the beam then diverges again. Thus, the divergence/convergence of the beam over the carriage length keeps the beam spot within the predetermined tolerances.

4 Claims, 4 Drawing Sheets

LASER BEAM DIVERGENCE COMPENSATION APPARATUS

BACKGROUND OF THE INVENTION

1. Field of the Invention

The invention relates to laser machining a work surface using movable optics in situations where the laser beam spot width at the work surface must be precisely controlled.

2. Description of the Related Art

The use of lasers to machine a work surface, particularly cylindrical die cutting operations, is well known in the art.

U.S. Pat. No. 4,427,872, issued to Saunders on Jan. 24, 1984, discloses a rotary die cutting apparatus where the laser beam is fixed in position and the laser beam acts tangentially on a cylindrical work surface. This is representative of the type of apparatus that brings the work surface to the laser beam.

U.S. Pat. No. 4,742,206, issued Dietterich et al. on May 3, 1988, discloses another rotary die cutting apparatus where the laser is mounted on a carriage which is parallel to the axis of the rotating cylindrical work surface. Thus, the laser assembly is able to slide above the longitudinal axis, projecting the cutting laser beam on the cylinder transverse to the longitudinal axis of the cylinder.

Both devices permit the cylinder to be machined along its entire length which may exceed 100 inches. Typical die cutting cylinders are fabricated from wood and require precise slots, both in length and kerf, to be cut therein so that a plurality of tools, such as knifes or indentation rules, can be inserted. The kerf cannot vary more than 1 to 2 thousandths of inch. If it is too large, the tool will fall out under the pressure of use. If the kerf is too narrow, forcing the tool in the slot will cause the cylinder to deform and, perhaps, even crack under the strain.

While the above described devices are capable of making the desired cuts, both types of prior art rotating die cutting apparatus suffer from the necessity of moving the work piece to the fixed laser, or the laser along the work piece. Both prior art solutions require moving a large mass (either the rotating mechanism with the die blank to be cut or the high power laser that is to do the cutting) along a predetermined and accurately defined path. The machinery and control required to accomplish this adds considerably to the cost of the machine.

A rotary die cutting apparatus that uses a fixed laser and eliminates the necessity of moving the work piece relative to the laser, other than simply rotating the cylinder, is not found in the prior art.

SUMMARY OF THE INVENTION

It is an object of the invention to provide a laser beam divergence compensation apparatus that enables a rotary die cutting machine to have a stationary laser and a fixed horizontal position rotation assembly for holding the die that is to be cut.

It is another object of the invention to provide a laser beam divergence compensation apparatus that adjusts the work surface beam spot size to the tolerances required for cutting wooden die cylinders.

It is still another object of the invention to provide a laser beam divergence compensation apparatus that makes use of the focusing lens, servo motor, and work surface positioning sensor which are typical for laser cutting devices having "flying optics".

It is still another object of the invention to provide an alternative embodiment laser beam divergence compensation apparatus that adjust the laser beam spot without the use of the focusing lens, servo motor, and work surface positioning sensor found in typical laser cutting devices having "flying optics".

The invention is a laser-machining apparatus for providing a laser beam spot to machine a work piece. A laser, fixed in position on said apparatus, said laser providing a beam having sufficient power to machine said work piece is provided. A carriage capable of moving in a predetermined amount in an axis that is substantially parallel to the surface of said work piece is provided. A mirror, movably attached to said carriage, angled to redirect the beam from said laser to the surface of the work piece is provided. A lens is provided that is movably attached to said carriage. The lens is aligned with said mirror such that said lens focuses the beam into a predetermined spot size on the surface of said work piece. Means for adjusting the vertical distance of said lens from the surface of the work piece is provided. The degree of vertical adjustment movement corresponds to the distance said mirror is from said laser such that the spot size of the beam incident on the surface of the work piece remains within a predetermined tolerance range over the range of movement of said carriage and regardless of the divergence of the laser beam from said laser.

DETAILED DESCRIPTION OF THE INVENTION

The implementation problems associated with moving heavy lasers or a rotating mechanism with its die blank can be solved by using "flying optics". "Flying optics" is defined as keeping the laser fixed in position on the apparatus and moving only the nozzle along the longitudinal axis of the wooden die cylinder that is to be cut. A redirection mirror needs to be added to the system to direct the laser beam to the nozzle as it moves along its carriage. "Flying optics" type of systems are well known in the metal cutting arts. When used for metal cutting, the laser beam is focused at or very close to the surface of the work piece. Since the purpose is to cut through the metal, the precise kerf is less of a concern. Therefore, the slight divergence of the laser beam over the horizontal distance that the nozzle moves relative to the fixed position of the laser plus the fact that focus of the lens nozzle is at or near the work piece surface does not present a problem.

However, in the rotary die cutting art, which requires cutting a wooden die that is frequently 120 inches long with precisely controlled kerf dimensions, prior art "flying optics" devices are not acceptable. The kerf needed for rotary die cutting is much wider than required for simple cutting through a piece of metal. Therefore, the laser must be focused at a vertical point above the surface of the wooden work piece so that a spot corresponding to the kerf size is projected onto the work piece surface. Further, the kerf must be kept within tolerances of 1 or 2 thousandths, from the end of the cylinder closest to the laser to the end that can be as great as 120 inches further away. Prior art "flying optics" laser cutting devices cannot meet these requirements.

Figure 1:
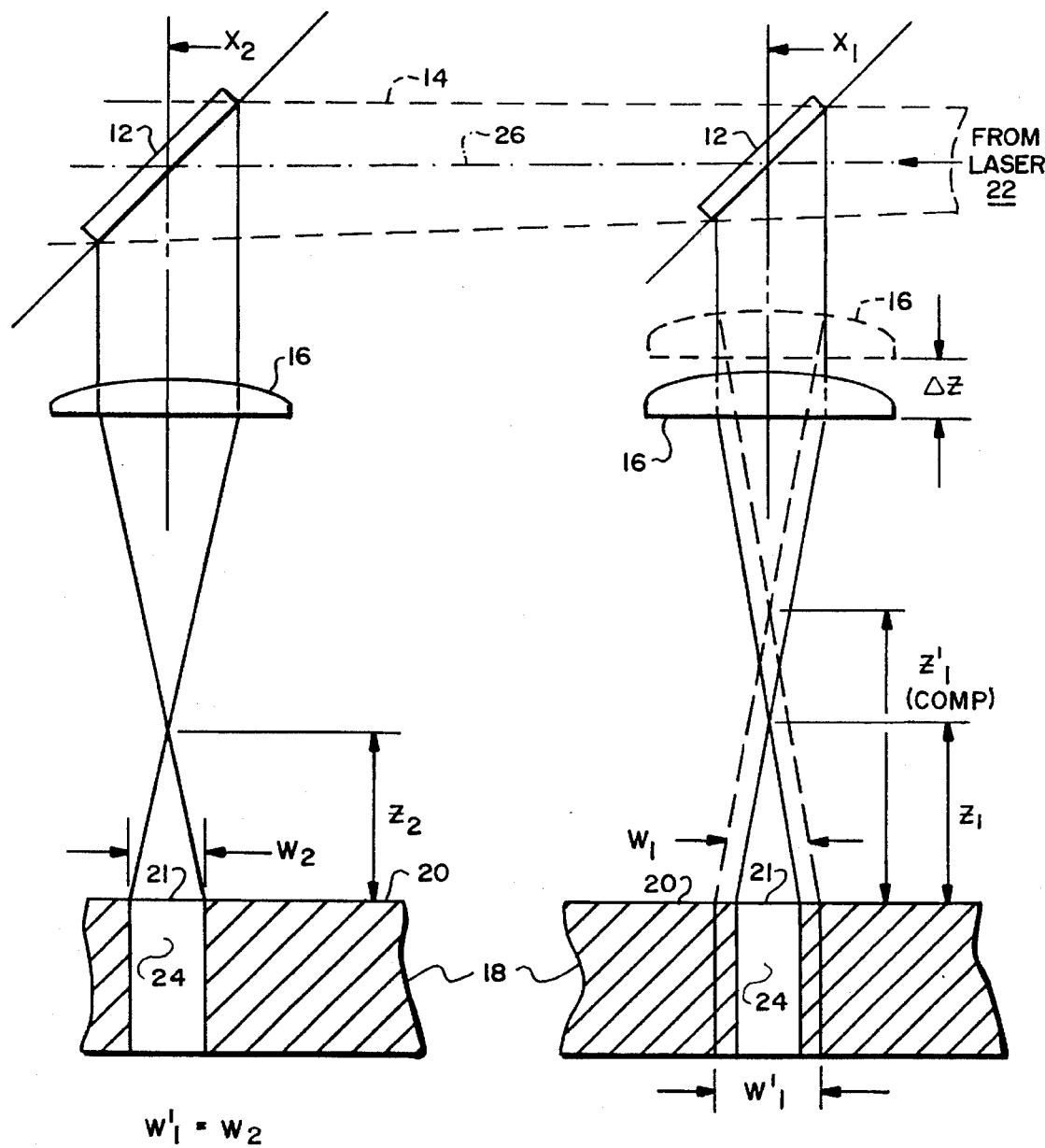
FIG. 1 is diagram showing laser beam divergence experienced with a fixed position laser and the solution to the divergence problem in accordance with the invention.

Referring now to FIG. 1, the above description of the problem is shown. The objective is to ensure that kerf 24 is uniform over the entire surface wooden die 18. As shown laser beam 14 diverges as the distance from laser 22 increases from $X_1$ to $X_2$. Laser beam 14 is emitted from laser 22 along a horizontal axis 26 which is parallel to the axis of rotation of wooden cylinder 18. In order to direct laser beam 14 to cylinder 18 so that it can be cut at surface 20, redirecting mirror 12 is used. As discussed above, the focus of redirected laser beam 14 should be at vertical height $Z_2$ above surface 20 when mirror 12 and focusing lens 16 are $X_2$ distance from laser 22. This enables spot 21 to be projected onto surface 20, resulting in kerf 24 being the desired width $W_2$. Moving mirror 12 and lens 16 to position $X_1$, which is closer to laser 22, and assuming that $Z_1$ equals Z2, the divergence of laser beam 14 causes kerf 24 to now have width $W_1$, which is less than $W_2$.

While slight changes in horizontal position, for example, a few inches, will not appreciably degrade kerf 24 beyond unacceptable tolerances suitable for rotary die cutting methods, movement greater than this amount will result in kerf 24 being either too wide or too narrow. Variations in kerf 24 beyond an acceptable tolerance of plus or minus a couple of thousandths renders kerf 24 useless to hold its intended steel tool (not shown).

The solution to the problem is to adjust the vertical position of lens 16 by a vertical increment $\Delta Z$ which changes the focus of lens 16 from $Z_1$ to $Z'_1$, and thus spot 21 will again correspond to the correct dimensions and kerf 24 will correspond to width $W'_1$. $W'_1$ equals $W_2$. $\Delta Z$ is a function of X, the focal length of lens 16, and the degree of divergence of laser beam 14. However, this can be easily calculated or empirically derived so that a table can be prepared that provides the required $\Delta Z$ for every X.

Figure 2:
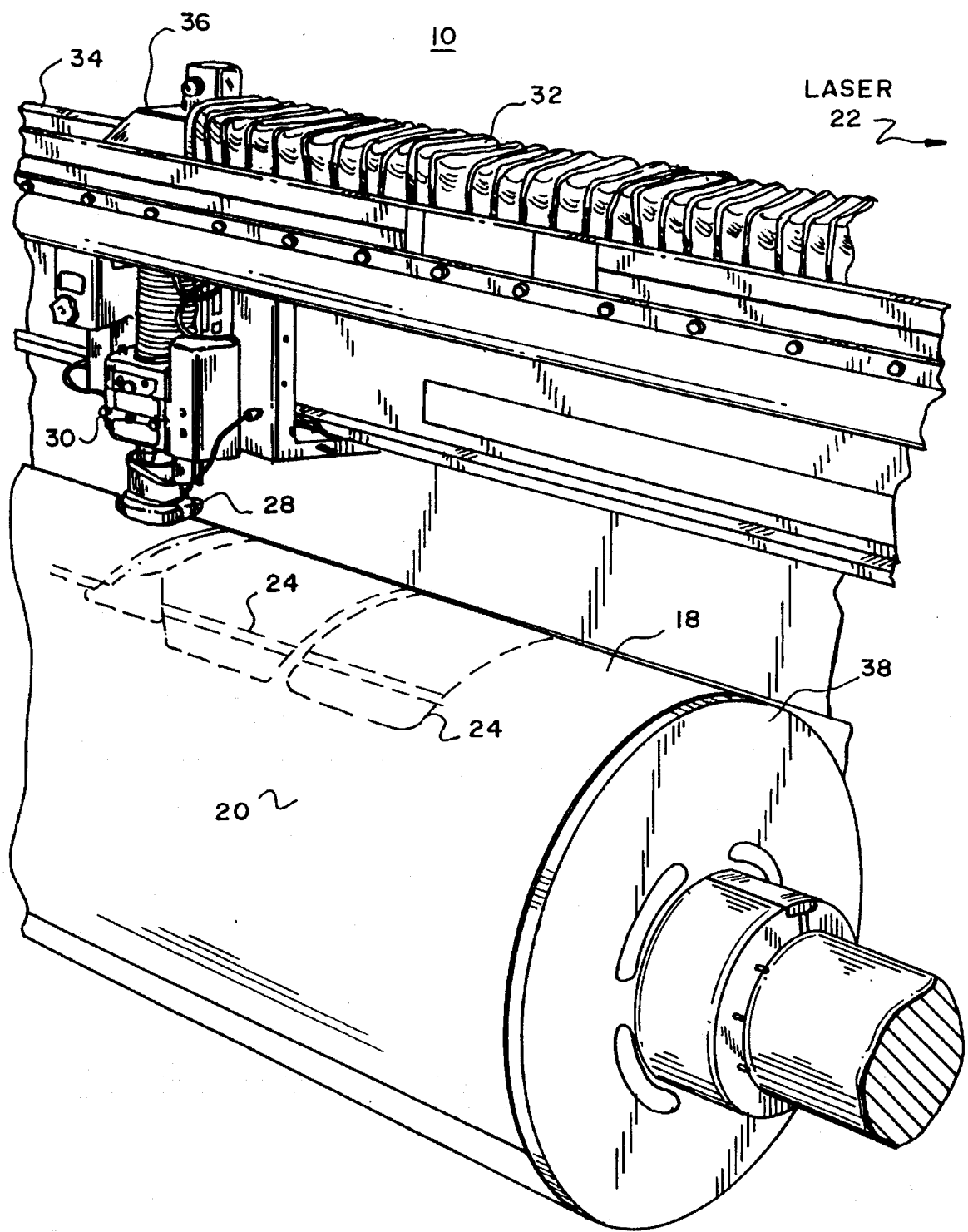
FIG. 2 is an isometric view of laser rotary die cutting apparatus in accordance with the invention.

FIG. 2 is an isometric view of laser rotary die cutting apparatus 10 in accordance with the invention. While the invention is shown with a rotary die cutting apparatus, it could also be fitted on laser cutting systems designed to cut flat dies or any system where laser beam divergence results in machining that is outside of acceptable tolerance limits.

Laser 22 (not shown) is preferably a 1,500 watt laser such as manufactured by PRC. However, other sizes will also work. Laser 22 is connected to mirror housing assembly 36 which holds mirror 12 (shown in FIG. 1) via bellows 32. Lens housing assembly 30, which holds lens 16 (shown in FIG. 1) is connected to assembly 36 so that both can move together as a unit along carriage 34. Dieboard cylinder 18 is held in apparatus 10 by means of mounting wheels 38 (only right wheel shown, left wheel is substantially identical) so that shoe assembly 28 rests on surface 20 of dieboard cylinder 18. Kerfs 24 on cylinder 18 are typical of the type of cuts that are placed in the wooden die.

Figure 3:
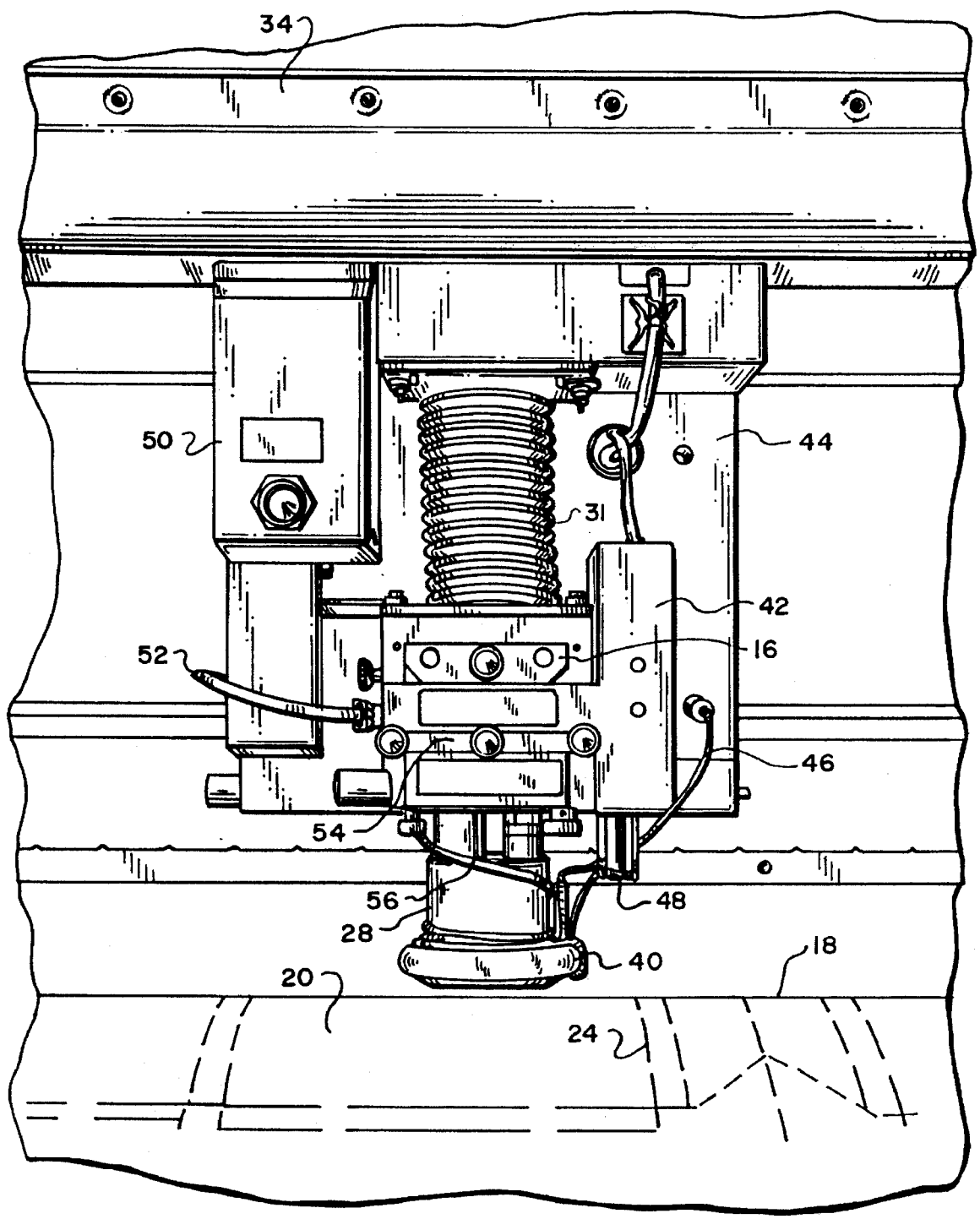
FIG. 3 is front detailed view of the lens and shoe assembly of the invention.

FIG. 3 is front detailed view of lens 16 and shoe assembly 28. Frame 44 serves to hold the various parts shown and connects to mirror assembly 36 (shown in FIG. 2) so that both can move together as a unit along carriage 34. As discussed above, the focal point of laser 22 must be at a predetermined distance above cutting surface 20. Therefore, shoe assembly 28 is urged against surface 20 by spring 56. Bladder 40 surrounds shoe 28 and is connected to an emergency shut switch via hose 46. If shoe 28 binds on surface 20, bladder 40 deforms thus causing an a pressure change which is sensed and apparatus 10 is shut down automatically. Sensor 48 is mechanically attached to shoe 28 and senses the vertical position of this assembly. Sensor 48, which is a plunger that moves vertical within encoder assembly 42 which produces a signal in response to changes in the vertical position of shoe 28 as it rides on surface 20. The signal from encoder 42 then controls servo assembly 50 which adjusts the vertical position of mirror 16 above surface 20 so that the desired kerf 24 can be produced. Centering adjustment 54 is used to center the nozzle (not shown) within the redirected laser beam 14.

As the focusing unit assembly moves along carriage 34, an additional signal is added or subtracted, with the additional signal corresponding to $\Delta Z$ from FIG. 1, depending on carriage 34's position relative to laser 22. Thus, the correction of the divergence of laser beam 14 is accomplished and beam spot 21 is kept within tolerances over the entire range of movement along carriage 34. It is important to note that the correction to the vertical position of lens 16 can be provided on a continuous or a discrete basis. Recall that small movements along carriage 34, for example, in the order of a few inches, are permissible without correction for laser beam divergence. Therefore, a $\Delta Z$ vertical correction could be applied only after the carriage has been moved a predetermined amount. In this manner, the kerf tolerances could be met but would experience a wider variation that would be found using a continuously correction device. If a continuous adjustment is used, that is, where a $\Delta Z$ correction is always added for every movement along carriage 34, regardless of high slight, the expected range of variation will be less. However, in most applications, that degree of accuracy may not be required.

Figure 4:
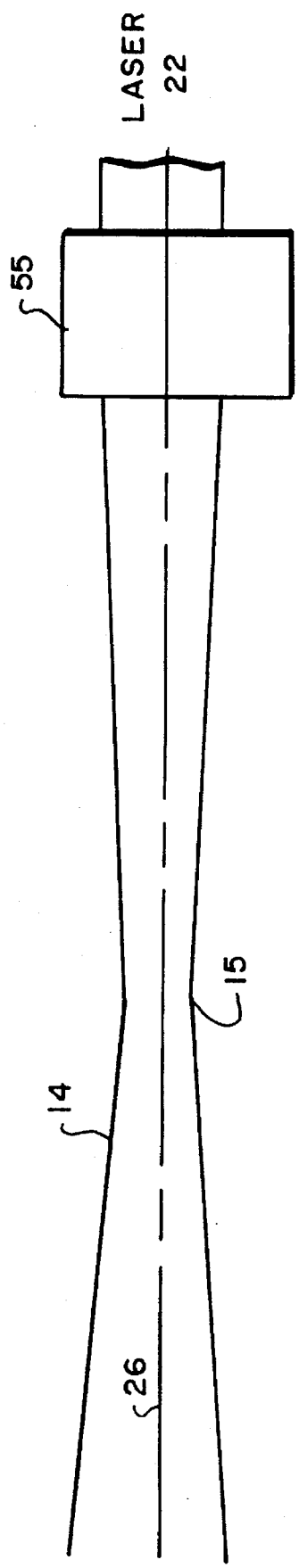
FIG. 4 shows a telescope lens assembly for an alternate embodiment.

FIG. 4 shows an alternative embodiment to the invention. In this embodiment, the need for a $\Delta Z$ correction to be added or subtracted to the positioning of lens 16 is eliminated by the addition of telescope lens assembly 55. Lens assembly 55 is a multi-lens unit that is placed close to laser 22 along horizontal axis 26. Lens assembly 55 causes beam to converge to waist 15. From waist 15, beam 14 will diverge again. However, by properly selecting lens 55 by optics techniques well known in the art, divergence/convergence of beam 14 can be averaged so that spot 21 will always be within necessary tolerance to cut kerf 24 as required.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A laser-machining apparatus for providing a laser beam spot to machine a work piece having a surface comprising:

a laser, fixed in position on said apparatus, said laser providing a beam having sufficient power to machine said work piece;

a carriage capable of moving a predetermined horizontal distance from said fixed laser along an axis that is substantially parallel to the surface of said work piece;

a mirror, attached to said carriage and moveable along an axis that is substantially perpendicular to the surface of said work piece, angled to redirect the beam from said laser to the surface of the work piece;

a lens, attached to said carriage, also moveable along the same axis as said mirror to define a vertical adjustment distance, said lens aligned with said mirror such that said lens focuses the beam into a predetermined spot size on the surface of said work piece;

means for adjusting the vertical adjustment distance of said lens from the surface of the work piece, with said vertical adjustment distance chosen dependent on to the horizontal distance of said carriage from said laser such that the spot size of the beam incident on the surface of the work piece remains within a predetermined tolerance range over the range of movement of said carriage and regardless of the divergence of the laser beam from said laser.

2. The apparatus of claim 1 wherein said work piece is a wooden cylinder die, said apparatus further comprising:

a support for said work piece;

means for rotating said support around an axis of rotation that is substantially parallel to the axis of movement of said carriage.

3. A laser-machining apparatus for providing a laser beam spot to machine a work piece having a surface comprising:

a laser, fixed in position on said apparatus, said laser providing a beam having sufficient power to machine said work piece;

a carriage capable of moving in predetermined increments along an axis that is substantially parallel to the surface of said work piece;

a mirror, movably attached to said carriage, angled to redirect the beam from said laser to the surface of the work piece;

a vertical adjustment lens, said vertical adjustment lens also movably attached to said carriage, said vertical adjustment lens aligned with said mirror such that said vertical adjustment lens focuses the beam into a predetermined spot size on the surface of said work piece;

at least one beam adjustment lens, said beam adjustment lens fixed in position adjacent to said laser, aligned to intercept the beam from said laser before the beam is redirected by said mirror; wherein said beam adjustment lens causes the diverging beam from said laser to converge to a predetermined waist cross-section enabling said vertical adjustment lens to focus the beam into in predetermined spot size on the surface of said work piece without the need for additional vertical adjustment of said vertical adjustment lens to adjust the spot size of the beam incident on the surface of the work piece over the range of movement of said carriage regardless of the divergence of the laser beam as the beam is emitted from said laser.

4. The apparatus of claim 3 wherein said work piece is a wooden cylinder die, said apparatus further comprising:

a support for said work piece;

means for rotating said support around an axis of rotation that is substantially parallel to the axis of movement of said carriage.

* * * * *